(12) United States Patent
Ueno et al.

(10) Patent No.: US 11,394,862 B2
(45) Date of Patent: Jul. 19, 2022

(54) VOICE INPUT APPARATUS, CONTROL METHOD THEREOF, AND STORAGE MEDIUM FOR EXECUTING PROCESSING CORRESPONDING TO VOICE INSTRUCTION

(71) Applicant: CANON KABUSHIKI KAISHA, Tokyo (JP)

(72) Inventors: Daiyu Ueno, Kanagawa (JP); Maiki Okuwaki, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/163,884

(22) Filed: Feb. 1, 2021

(65) Prior Publication Data
US 2021/0243354 A1    Aug. 5, 2021

(30) Foreign Application Priority Data
Feb. 5, 2020 (JP) .............................. JP2020-018211

(51) Int. Cl.
| | |
|---|---|
| H04N 5/225 | (2006.01) |
| H04N 5/232 | (2006.01) |
| G06T 7/70 | (2017.01) |
| G06F 3/16 | (2006.01) |
| G06V 40/16 | (2022.01) |

(52) U.S. Cl.
CPC ........... *H04N 5/23203* (2013.01); *G06F 3/16* (2013.01); *G06T 7/70* (2017.01); *G06V 40/16* (2022.01); *H04N 5/23218* (2018.08)

(58) Field of Classification Search
CPC .. H04N 5/23203; H04N 5/23218; G06T 7/70; G06V 40/16; G06F 3/16
USPC .................................................... 348/207.99
See application file for complete search history.

(56) References Cited

U.S. PATENT DOCUMENTS

2014/0214429 A1*  7/2014  Pantel .................... G10L 15/22
                                                            704/275
2015/0296294 A1* 10/2015  Paquier ............... G10L 21/0364
                                                              381/71.1
(Continued)

FOREIGN PATENT DOCUMENTS

| JP | H02131300 A | 5/1990 |
| JP | 2017054065 A | 3/2017 |
| JP | 2019086535 A | 6/2019 |

OTHER PUBLICATIONS

Extended European Search Report issued in European Appln. No. 21154514.0 dated Jun. 24, 2021.

*Primary Examiner* — Usman A Khan
(74) *Attorney, Agent, or Firm* — Rossi, Kimms & McDowell LLP

(57) ABSTRACT

A voice input apparatus inputs voice and performs control to, in a case where a second voice instruction for operating the voice input apparatus is input in a fixed period after a first voice instruction for enabling operations by voice on the voice input apparatus is input, execute processing corresponding to the second voice instruction. The voice input apparatus, in a case where it is estimated that a predetermined user issued the second voice instruction, executes processing corresponding to the second voice instruction when the second voice instruction is input, even in a case where the first voice instruction is not input.

15 Claims, 10 Drawing Sheets

(56) References Cited

U.S. PATENT DOCUMENTS

| | | | |
|---|---|---|---|
| 2015/0331665 A1* | 11/2015 | Ishii | H04N 21/4826 |
| | | | 715/728 |
| 2018/0293221 A1 | 10/2018 | Finkelstein | |
| 2021/0241766 A1 | 8/2021 | Ueno | |

* cited by examiner

VOICE INPUT APPARATUS, CONTROL METHOD THEREOF, AND STORAGE MEDIUM FOR EXECUTING PROCESSING CORRESPONDING TO VOICE INSTRUCTION

BACKGROUND OF THE INVENTION

Field of the Invention

The present invention relates to a voice input apparatus, a control method thereof, and a storage medium for executing processing corresponding to a voice instruction.

Description of the Related Art

In recent years, apparatuses provided with a voice operation function that is able to recognize spoken voice inputs and perform operations corresponding to the voice inputs are known. For example, an operation for displaying desired pages for viewing, an operation for changing the current setting values of the apparatus, and an operation for calling a specific person or inputting the text of an e-mail message can be performed by the voice operation function using voice. While the voice operation function has the advantage of enabling operations to be performed with natural speech, the apparatus may also react to unintended voice, resulting in erroneous operations.

Japanese Patent Laid-Open No. 2019-86535 proposes a technology for reducing the occurrence of erroneous operations, by an apparatus capable of voice operations receiving a specific voice command called a wake word for enabling voice operations and receiving voice operations for only a predetermined period after the wake word. Also Japanese Patent Laid-Open No. 2017-54065 proposes a technology for recognizing the state of a user's mouth from subject images, and receiving voice operations in the case where the mouth is recognized as being open.

There is a problem with the technology proposed by Japanese Patent Laid-Open No. 2019-86535 in that the time and effort of always inputting the wake word is required in order to execute voice operations. When operating an image capture apparatus, there are times when a fast setting change is desired to avoid missing a photo opportunity. In the case of requiring the time and effort of always inputting the wake word, not only do operations simply become troublesome but there is a possibility of missing a desired photo opportunity when a voice operation is performed after giving the wake word.

Also, with the technology proposed by Japanese Patent Laid-Open No. 2017-54065, in cases such as where a user's hand is covering his or her mouth (e.g., when making a peace sign in front of his or her mouth), cases can arise where voice operations cannot be performed due to not being able to recognize the user's mouth from images.

SUMMARY OF THE INVENTION

The present disclosure has been made in consideration of the aforementioned issues, and realizes a technology for suppressing the occurrence of erroneous operations while enabling quick operations when performing voice operations.

In order to solve the aforementioned problems, one aspect of the present disclosure provides a voice input apparatus comprising: a voice input device configured to input voice; one or more processors; and a memory storing instructions which, when the instructions are executed by the one or more processors, cause the voice input apparatus to function as: a control unit configured to perform control to, in a case where a second voice instruction for operating the voice input apparatus is input in a fixed period after a first voice instruction for enabling operations by voice on the voice input apparatus is input, execute processing corresponding to the second voice instruction, wherein the control unit, in a case where it is estimated that a predetermined user issued the second voice instruction, executes processing corresponding to the second voice instruction when the second voice instruction is input, even in a case where the first voice instruction is not input.

Another aspect of the present disclosure provides, a control method of a voice input apparatus, the voice input apparatus comprising a voice input device configured to input voice, the control method comprising: performing control to, in a case where a second voice instruction for operating the voice input apparatus is input in a fixed period after a first voice instruction for enabling operations by voice on the voice input apparatus is input, execute processing corresponding to the second voice instruction, wherein, in the controlling, in a case where it is estimated that a predetermined user issued the second voice instruction, processing corresponding to the second voice instruction is executed when the second voice instruction is input, even in a case where the first voice instruction is not input.

Still another aspect of the present disclosure provides, a non-transitory computer-readable storage medium comprising instructions for performing a control method of a voice input apparatus, the voice input apparatus comprising a voice input device configured to input voice, the control method comprising: performing control to, in a case where a second voice instruction for operating the voice input apparatus is input in a fixed period after a first voice instruction for enabling operations by voice on the voice input apparatus is input, execute processing corresponding to the second voice instruction, wherein, in the controlling, in a case where it is estimated that a predetermined user issued the second voice instruction, processing corresponding to the second voice instruction is executed when the second voice instruction is input, even in a case where the first voice instruction is not input.

According to the present invention, it becomes possible to suppress the occurrence of erroneous operations while enabling quick operations when performing voice operations.

Further features of the present invention will become apparent from the following description of exemplary embodiments (with reference to the attached drawings).

DESCRIPTION OF THE EMBODIMENTS

First Embodiment

Figure 1A:
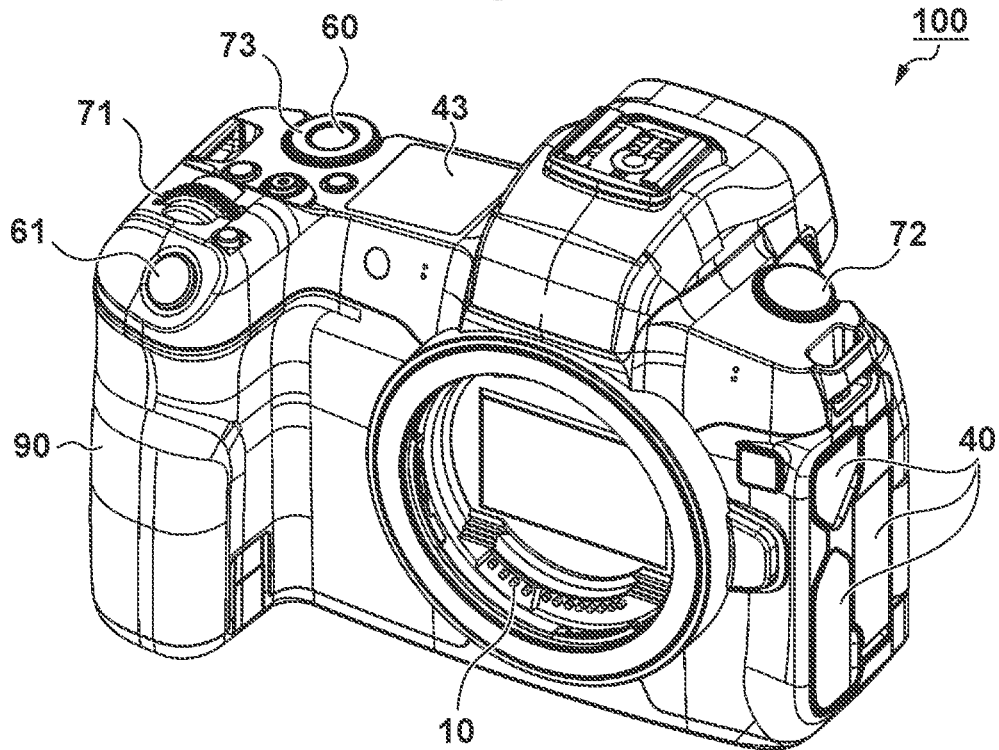
FIGS. 1A and 1B diagrams showing an external appearance of a digital camera serving as an example of a voice input apparatus according to the present invention.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

Hereinafter, an example using a digital camera capable of operations using voice recognition as an example of a voice input apparatus will be described. However, the present embodiment is applicable not only to digital cameras but also to other dev ices capable of operations using voice recognition. These devices may include smartphones, personal computers, game machines, tablet terminals, music players and medical equipment, for example.

Configuration of Digital Camera

Figure 1B:
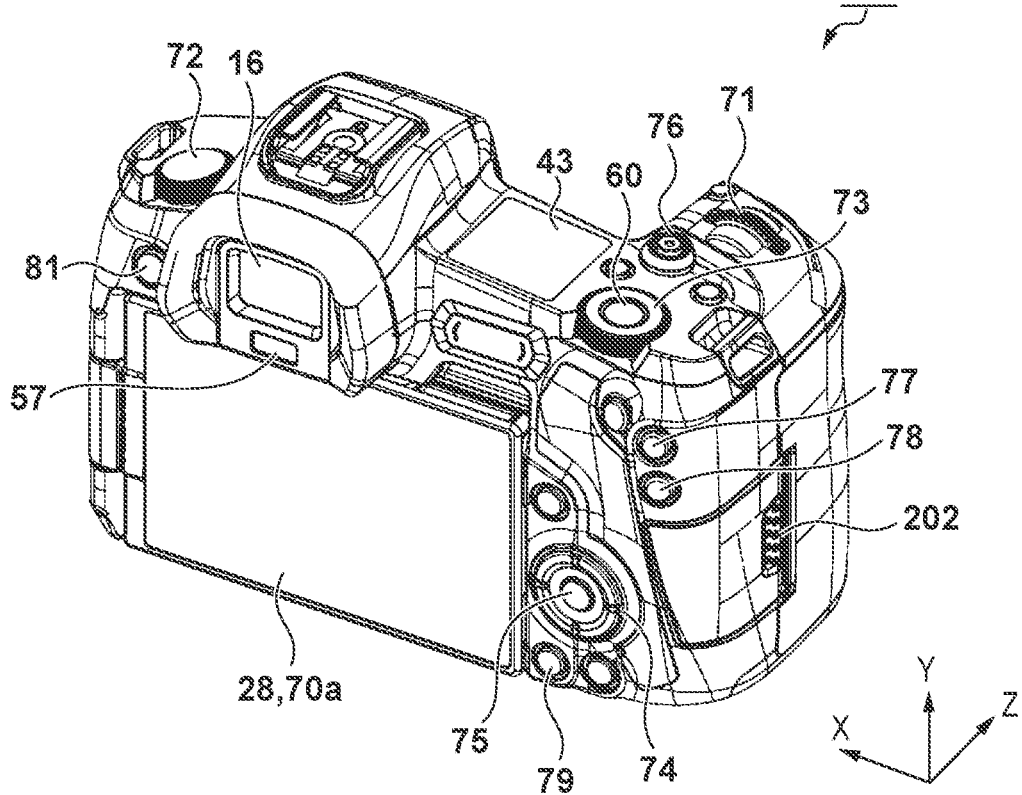

FIG. 1A and FIG. 1B show an external view of a digital camera 100 serving as an example of a voice input apparatus according to the present embodiment. FIG. 1A is a front perspective view of the digital camera 100, and FIG. 1B is a back perspective view of the digital camera 100. A display unit 28 is a display unit that is provided on a camera back surface and displays images and a variety of information. A touch panel 70a is able to detect touch operations on the display surface (operation surface) of the display unit 28. A viewfinder external display unit 43 is a display unit provided on a camera upper surface, and various setting values of the camera including shutter speed and aperture are displayed. A shutter release 61 is an operation unit for giving a shooting instruction. A mode changeover switch 60 is an operation unit for switching between various modes. A terminal cover 40 is a cover that protects a connector (not shown) for connecting a connecting cable of an external device to the digital camera 100.

A main electronic dial 71 is a rotary operation member that is included in an operation unit 70, and processing such as changing shutter speed, aperture and other setting values is possible, by turning this main electronic dial 71. A power switch 72 is an operation member that switches ON and OFF power of the digital camera 100. A sub-electronic dial 73 is a rotary operation member that is included in the operation unit 70, and is able to move the selected frame, perform image jump and the like. A cross key 74 is an operation member that is included in the operation unit 70, and has a press button capable of being pressed in four directions. Operations that depend on the direction in which the cross key 74 is pressed are possible. A SET button 75 is a press button that is included in the operation unit 70 and is mainly used for setting selected items and the like. A moving image button 76 is used for instructing start and stop of moving image shooting (recording). A voice input button 77 is a button that is able to restrict operation by voice to be enabled only when this button is being pressed, according to the settings of the digital camera 100. In the following description, however, the case where setting values that enable voice to be input irrespective of whether or not the voice input button 77 is being pressed are set and various types of processing operate in response to voice operations will be illustrated to an example. A zoom button 78 is an operation button that is included in the operation unit 70 and is for switching ON and OFF a zoom mode in live view display of a shooting mode. Enlargement and reduction of live view images can be performed, by operating the main electronic dial 71 after setting the zoom mode to ON. In a playback mode, the zoom button 78 functions as a zoom button for enlarging the playback image and increasing the magnification ratio. A play button 79 is an operation button that is included in the operation unit 70 and is for switching between the shooting mode and the playback mode. By pressing the play button 79 during the shooting mode, the mode can be transitioned to the playback mode, and the latest image among the images recorded on a recording medium 200 can be displayed on the display unit 28. A menu button 81 is included in the operation unit 70, and by being pressed, a menu screen that is variously settable is displayed on the display unit 28. The user is able to configure various settings using the menu screen displayed on the display unit 28 and the cross key 74 and SET button 75.

A communication terminal 10 is a communication terminal for the digital camera 100 to communicate with a lens unit 150 (detachable) described later. An eyepiece unit 16 is an eyepiece unit of an eyepiece viewfinder (viewfinder that the user looks into), and video displayed on an internal EVF (Electronic Viewfinder) 29 is visible to the user through the eyepiece unit 16. An eye approach detection unit 57 is an eye approach detection sensor that detects whether the image taker's eye has approached the eyepiece unit 16.

A cover 202 is the cover of a slot that houses the recording medium 200. A grip part 90 is a holding part that is shaped to be easy to grip with the right hand when the user is holding the digital camera 100 ready to shoot. The shutter release 61 and the main electronic dial 71 are disposed in positions that are operable with the index finger of the right hand, in a state where the digital camera 100 is held with the little finger, ring finger and middle finger of the right hand around the grip pan 90. Also, the sub-electronic dial 73 is disposed in a position operable with the thumb of the right hand in the same state.

Figure 2:
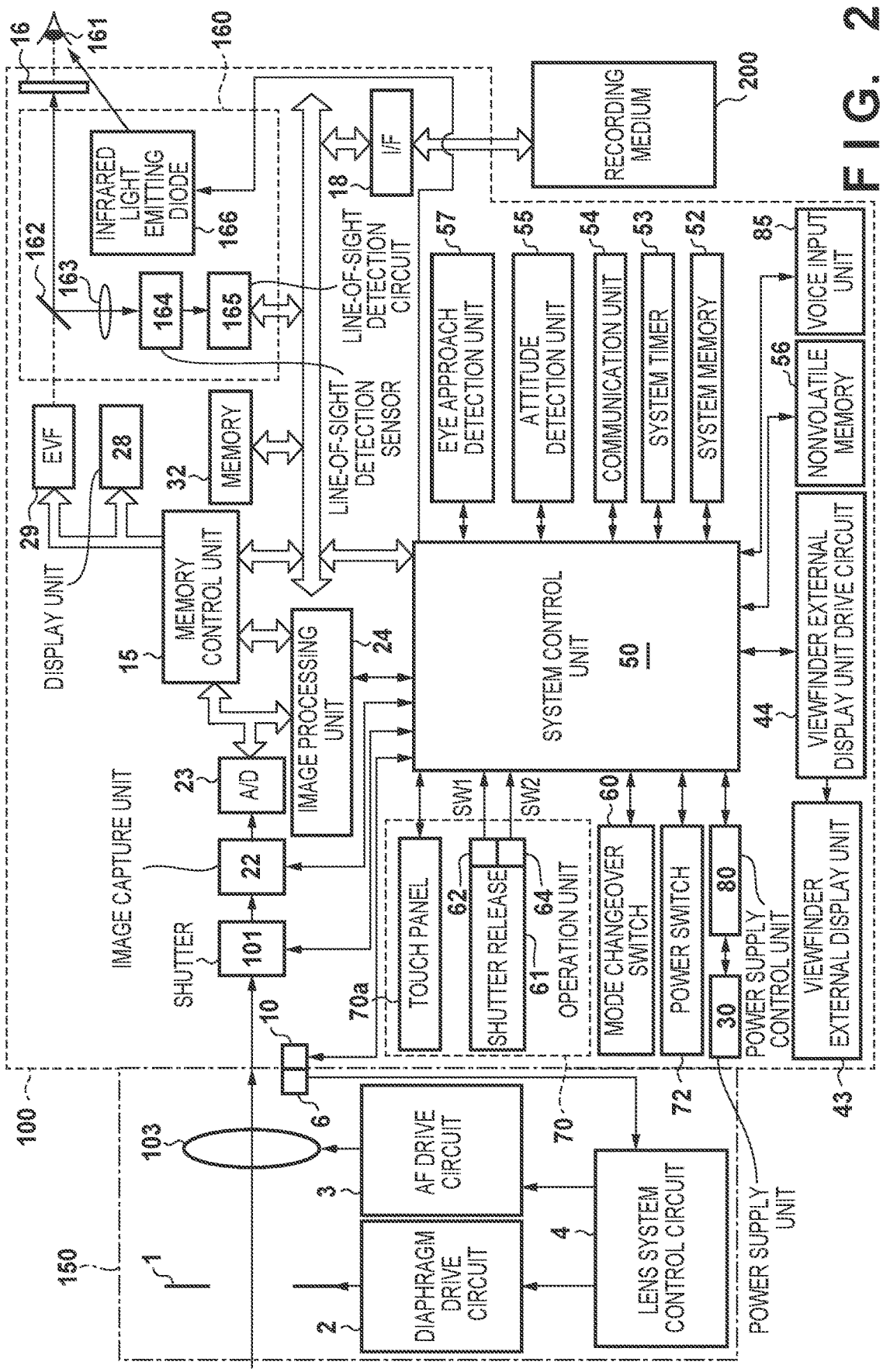
FIG. 2 is a block diagram showing an example functional configuration of the digital camera according to a first embodiment.

Next, an example functional configuration of the digital camera 100 according to the present embodiment will be described, with reference to FIG. 2. In FIG. 2, the lens unit 150 is a lens unit that is equipped with an interchangeable shooting lens. The lens 103 is normally constituted by a plurality of lenses, but is simplified here, with only one lens being shown. A communication terminal 6 is a communication terminal for the lens unit 150 to communicate with the digital camera 100. The lens unit 150 communicates with a system control unit 50 via this communication terminal 6 and the aforementioned communication terminal 10, and controls a diaphragm 1 via a diaphragm drive circuit 2 with an internal lens system control circuit 4. Focusing is performed thereafter by displacing the lens 103, via an AF drive circuit 3.

A shutter 101 is a focal-plane shutter that is able to freely control the exposure time of an image capture unit 22 by the control of the system control unit 50.

The image capture unit 22 is an image sensor that is constituted by a CCD or CMOS device or the like that converts optical images into electrical signals. An A/D converter 23 is used in order to convert analog signals that are output by the image capture unit 22 into digital signals.

An image processing unit 24 performs color conversion processing and predetermined resize processing such as pixel interpolation and reduction on data from the A/D converter 23 or data from a memory control unit 15 described later. Also, the image processing unit 24 performs predetermined computational processing using captured image data. The system control unit 50 performs exposure control and ranging control based on the computation result obtained by the image processing unit 24. TTL (through the lens) AF (autofocus) processing. AE (auto exposure) processing, and EF (electronic flash) processing are thereby performed. The image processing unit 24 further performs predetermined computational processing using captured image data, and performs TTL AWB (auto white balance) processing based on the obtained computation result.

The memory control unit 15 controls data transmission and reception between the A/D converter 23, the image processing unit 24, and a memory 32. The output data from the A/D converter 23 is written to the memory 32 via the image processing unit 24 and the memory control unit 15 or directly via the memory control unit 15. The memory 32 stores image data obtained by the image capture unit 22 and converted into digital data by the A/D converter 23, and image data for displaying on the display unit 28 and the EVF 29. The memory 32 is provided with sufficient storage capacity to store a predetermined number of still images or moving images and audio of a predetermined time length.

Also, the memory 32 doubles as a memory for image display (video memory). Image data for display written to the memory 32 is displayed by the display unit 28 or the EVF 29 via the memory control unit 15. The display unit 28 and the EVF 29 perform display that depends on the signal from the memory control unit 15 on a display device such as an LCD or organic electroluminescent display. Live view display (LV display) can be performed by sequentially transferring data A/D converted by the A/D converter 23 and stored in the memory 32 to the display unit 28 or the EVF 29 and displaying the data. Hereinafter, images that are displayed in live view will be called live view images (LV images).

An infrared light emitting diode 166 is a light emitting element for detecting a line-of-sight position of the user on the viewfinder screen, and irradiates an eyeball (eye) 161 of the user whose eye has approached the eyepiece unit 16 with infrared light. The infrared light emitted by the infrared light emitting diode 166 is reflected by the eyeball (eye) 161, and this infrared reflected light reaches a dichroic mirror 162. The dichroic mirror 162 reflects only infrared light and transmits visible light. The infrared reflected light whose light path has been changed forms an image on an image capture surface of a line-of-sight detection sensor 164 via an image forming lens 163. The image forming lens 163 is an optical member constituting a line-of-sight detection optical system. The line-of-sight detection sensor 164 is constituted by an image device such as a CCD image sensor.

The line-of-sight detection sensor 164 photoelectrically converts incident infrared reflected light into electrical signals and outputs the electrical signals to a line-of-sight detection circuit 165. The line-of-sight detection circuit 165 includes at least one processor, and detects the line-of-sight position of the user from an image or movement of the user's eyeball (eye) 161, based on the output signal of the line-of-sight detection sensor 164, and outputs detection information to the system control unit 50. In this way, a line-of-sight detection block 160 is constituted by the dichroic mirror 162, the image forming lens 163, the line-of-sight detection sensor 164, the infrared light emitting diode 166, and the line-of-sight detection circuit 165. The line-of-sight detection block 160 detects the line of sight with a so-called corneal reflection method, for example. The corneal reflection method is a method that involves detecting the orientation and position of the line of sight from the positional relationship between the pupil of the eyeball (eye) 161 and reflected light that occurs due to the infrared light emitted by the infrared light emitting diode 166 being reflected particularly by the cornea of the eyeball (eye) 161. There are various other methods of detecting the orientation and position of the line of sight such as a so-called scleral reflection method that utilizes the difference in light reflectance between the iris and the white of the eye. Note that the line-of-sight detection unit may use any other method besides the above that can detect the orientation and position of the line of sight.

Various setting values of the digital cameras 100 including shutter speed and aperture are displayed on the viewfinder external display unit 43 via a viewfinder external display unit drive circuit 44.

A nonvolatile memory 56 is an electrically erasable-recordable memory, and a Flash ROM, for example, is used. Constants, programs and the like for use in operations of the system control unit 50 are stored in the nonvolatile memory 56. Programs as referred to here are computer programs for executing various flowcharts described later in the present embodiment.

The system control unit 50 includes one or more processors such as a CPU, for example, and controls the entire digital camera 100. Each processing of the present embodiment described later is realized, by programs recorded on the nonvolatile memory 56 being extracted to the system memory 52 and executed by the system control unit 50. A RAM, for example, is used for the system memory 52, and constants, variables, programs read out from the nonvolatile memory 56 and the like for use in operations of the system control unit 50 are extracted thereto. The system control unit 50 also performs display control by controlling the memory 32, the display unit 28 and the like.

A system timer 53 is a timing unit for measuring time that is used in various controls and the time of a built-in clock. The mode changeover switch 60, a first shutter switch 62, a second shutter switch 64 and the operation unit 70 are operation units for inputting various types of operating instructions to the system control unit 50. The mode changeover switch 60 switches the operating mode of the system control unit 50 to one of a still image shooting mode, a moving image shooting mode, and the like. Modes of the still image shooting mode include an auto shooting mode, an auto scene differentiation mode, a manual mode, an aperture priority mode (Av mode), a shutter speed priority mode (Tv mode), and a program AE mode (P mode). Also, there are various scene modes configured to shooting scene-specific shooting settings, a custom mode, and the like. Using the mode changeover switch 60, the user is able to directly switch to any of these modes. Alternatively, a configuration may be adopted in which after initially switching to a shooting mode list screen with the mode changeover switch 60, one of the plurality of displayed modes is selected, and switching is performed using another operation member. Similarly, the moving image shooting mode may also include a plurality of modes.

The first shutter switch 62 rums ON with a so-called half press (shooting preparation instruction) when the shutter release 61 provided in the digital camera 100 is partially operated, and generates a first shutter switch signal SW1. Shooting preparation operations such as AF (autofocus) processing, AE (auto exposure) processing, AWB (auto white balance) processing and EF (electronic Hash) processing are started with the first shutter switch signal SW1.

The second shutter switch 64 turns ON with a so-called full press (shooting instruction) when the shutter release 61 is fully operated, and generates a second shutter switch signal SW2. The system control unit 50 starts the operations of a series of shooting processing from signal readout from the image capture unit 22 to writing of the captured image to the recording medium 200 as an image file, with the second shutter switch signal SW2.

The operation unit 70 is various types of operation members serving as input units that receive operations from the user. As described above, the operation unit 70 includes the shutter release 61, the touch panel 70a, the main electronic dial 71, the sub-electronic dial 73, the cross key 74, and the SET button 75. The operation unit 70 also includes the moving image button 76, the voice input button 77, the zoom button 78, the play button 79, and the menu button 81.

A power supply control unit 80 is constituted by a battery detection circuit, a DC-DC converter, a switch circuit for switching the block that is electrified, and the like, and detects whether a battery is mounted, the type of battery, and the remaining battery. Also, the power supply control unit 80 controls the DC-DC converter based on the detection results and instructions of the system control unit 50, and supplies a required voltage to various components including the recording medium 200 for a required period. A power supply unit 30 includes a primary battery such as an alkaline battery or a lithium battery, a secondary battery such as a NiCd battery, a NiMH battery or Li battery, and an AC adaptor.

A recording medium I/F 18 is an interface with the recording medium 200, which is a memory card, a hard disk or the like. The recording medium 200 is a recording medium such as a memory card for recording shot images, and is constituted by a semiconductor memory, a magnetic disk or the like.

A communication unit 54 includes a communication circuit or a communication module, for example, is connected wirelessly or by cable, and performs transmission and reception of video signals and audio signals. The communication unit 54 is also capable of connecting to wireless communication for mobile phones, a wireless LAN (Local Area Network), and the Internet. The communication unit 54 is capable of transmitting images (including live view images) captured by the image capture unit 22 and images recorded on the recording medium 200, and is able to receive images and various other information from external devices.

An attitude detection unit 55 detects the attitude of the digital camera 100 relative to the direction of gravity. An image shot with the image capture unit 22 can be differentiated as being an image shot with the digital camera 100 held horizontally or an image shot with the digital camera 100 held vertically, based on the attitude detected by the attitude detection unit 55. It is possible for the system control unit 50 to add orientation information that depends on the attitude detected by the attitude detection unit 55 to the image file of an image captured by the image capture unit 22, and to rotate and record images. As for the attitude detection unit 55, an acceleration sensor, a gyroscope sensor or the like can be used. It is also possible to detect movement (pan, tilt, lift, whether stationary or not, etc.) of the digital camera 100, using the acceleration sensor, gyroscope sensor or the like serving as the attitude detection unit 55.

The eye approach detection unit 57 is an eye approach detection sensor that detects that the eye (object) 161 has moved closer to (approached) or has moved away (withdrawn) from the eyepiece unit 16 of the viewfinder (approach detection). The system control unit 50 switches between display (display state)/non-display (non-display state) of the display unit 28 and the EVF 29, according to the state detected by the eye approach detection unit 57. More specifically, at least in the case where the digital camera 100 is in a shooting standby state and the setting for switching the display destination of live view images captured by the image capture unit 22 is set to automatic switching, display is set to ON with die display unit 28 as the display destination and the EVF 29 is set to non-display, when the eye has not approached the eyepiece unit 16. Also, display is set to ON with the EVF 29 as the display destination and the display unit 28 is set to non-display, when the eye has approached the eyepiece unit 16. An infrared proximity sensor, for example, can be used for the eye approach detection unit 57, and the eye approach detection unit 57 is able to detect the approach of an object of some sort to the eyepiece unit 16 of the viewfinder that incorporates the EVF 29. In the case where an object has approached the eyepiece unit 16, infrared light projected from a projection unit (not shown) of the eye approach detection unit 57 is reflected and received by a light receiving unit (not shown) of the infrared proximity sensor. The eye approach detection unit 57 is also able to differentiate how close an object has approached to the eyepiece unit 16 (eye approach distance), depending on the amount of infrared light that is received. In this way, the eye approach detection unit 57 performs eye approach detection for detecting the proximity distance of an object to the eyepiece unit 16. Note that, in the present embodiment, the projection unit and light receiving unit of the eye approach detection unit 57 are separate devices to the aforementioned infrared light emitting diode 166 and line-of-sight detection sensor 164. The infrared light emitting diode 166 may, however, also serve as the projection unit of the eye approach detection unit 57. Furthermore, the line-of-sight detection sensor 164 may also serve as the light receiving unit. The case where an object that approaches within a predetermined distance to the eyepiece unit 16 is detected from a non-eye approached state (non-approached state) will be taken as detecting that the user's eye has approached the eyepiece unit 16. The case where an object whose approach was detected moves away by the predetermined distance or more from an eye approached state (approached state) will be taken as detecting that the user's eye has withdrawn from the eyepiece unit 16. The threshold for detecting the approach of the user's eye and the threshold for detecting the withdrawal of the user's eye may differ due to providing hysteresis, for example. Also, from after it is detected that the user's eye has approached until when it is detected that the user's eye has withdrawn will be taken as the eye approached state. From after it is detected that the user's eye has withdrawn until when it is detected that the user's eye has approached will be taken as the non-eye approached state. Note that the infrared proximity sensor is given as an example, and any sensor that is able to detect the approach of an eye or an object that is viewed as the user's eye having approached the eyepiece unit 16 may be employed for the eye approach detection unit 57.

The system control unit 50 is able to detect the following operations or states based on the output front the line-of-sight detection block 160.

Line of sight of the user whose eye has approached the eyepiece unit 16 being newly input (detected). That is, the start of line-of-sight input.

State where there is line-of-sight input of the user whose eye has approached the eyepiece unit 16.

State where the user whose eye has approached the eyepiece unit 16 is gazing steadily.

Line of sight of the user whose eye has approached the eyepiece unit 16 having shifted. That is, the end of line-of-sight input.

State where there is no line-of-sight input of the user whose eye has approached the eyepiece unit 16.

The steady gaze described here refers to the case where the line-of-sight position of the user has not exceeded a predetermined amount of movement within a predetermined time.

The touch panel 70a and the display unit 28 can be integrally constituted. For example, the touch panel 70a is constituted such that the transmissivity of light does not interfere with display on the display unit 28, and is attached to the upper layer of the display surface of the display unit 28. Input coordinates of the touch panel 70a are associated with display coordinates on the display screen of the display unit 28. GUIs (graphical user interfaces) that appear as though the user is directly operating the screen displayed on the display unit 28 can thereby be provided. The system control unit 50 is able to detect the following operations on the touch panel 70a or states of the touch panel 70a.

Finger or pen that was not touching the touch panel 70a newly touching the touch panel 70a. That is, the start of touching (hereinafter, referred to as a touch-down).

State where a finger or pen is touching the touch panel 70a (hereinafter, referred to as a touch-on).

Finger or pen moving while touching the touch panel 70a (hereinafter, referred to as a touch-move).

Finger or pen that was touching the touch panel 70a being lifted. That is, the end of touching (hereinafter, referred to as a touch-up).

State where nothing is touching the touch panel 70a (hereinafter, referred to as a touch-off).

A touch-on is also simultaneously detected when a touch-down is detected. A touch-on is normally continuously detected after a touch-down, as long as a touch-up is not detected. A touch-move is also detected in a state where a touch-on is being detected. Even when a touch-on is being detected, a touch-move is not detected unless the touch position moves. A touch-off is after a touch-up of all fingers and pens that were touching has been detected.

These operations and states and the position coordinates where a finger or pen is touching the touch panel 70a are notified to the system control unit 50 through an internal bus. The system control unit 50 determines what kind of operation (touch operation) was performed on the touch panel 70a based on the notified information. With regard to a touch-move, the movement direction of the finger or pen that moves on the touch panel 70a can also be determined for every vertical component and horizontal component on the touch panel 70a, based on the change in the position coordinates. The case where a touch-move being performed for a predetermined distance or more is detected will be taken as determining that a slide operation has been performed. An operation that involves quickly moving only a certain distance with a finger touching the touch panel and then directly lifting the finger is called a flick. A flick is, in other words, an operation that involves quickly tracing over the touch panel 70a as if flicking the touch panel 70a with a finger. When a touch-move being performed for a predetermined distance or more at a predetermined speed or more is detected, followed directly by a touch-up being detected, it can be determined that a flick was performed (it can be determined that there was a flick following a slide operation). Furthermore, a touch operation that involves a plurality of places (e.g., two points) being touched simultaneously and the touch positions being moved closer together is called a pinch-in, and a touch operation that involves the plurality of touch positions being moved further apart is called a pinch-out. The pinch-out and the pinch-in are collectively referred to as a pinch operation (or simply a pinch). Any of touch panels employing various methods may be used for the touch panel 70a, such as a resistive touch panel, a capacitive touch panel, a surface acoustic wave touch panel, an infrared touch panel, an electromagnetic induction touch panel, an image recognition touch panel, and an optical sensor touch panel. Depending on the method, contact with the touch panel is detected as a touch or a finger or pen approaching the touch panel is detected as a touch, and either method may be used.

A voice input unit 85 includes an unillustrated microphone, and performs processing for acquiring ambient sounds around the digital camera and voice instructions from the user described later. The voice input unit 85 may input voice from a plurality of unillustrated microphones disposed at different positions on the casing of the voice input apparatus. In this case, the system control unit 50 is able to estimate the direction from which the voice was issued, based on the time lag of voice that is input, and the like.

Also, the present invention is applicable not only to the digital camera itself but also to a control device that communicates with the digital camera (including a network camera) via wired or wireless communication and remotely controls the digital camera. As for devices that control a digital camera remotely, there are devices such as smartphones, tablet PCs and desktop PCs, for example. The digital camera is controllable from a remote location, by notifying commands that cause the digital camera to perform various operations and configure various settings from the control device side, based on operations performed on the control device side and processing performed on the control device side. Also, a configuration may be adopted in which live view images shot with the digital camera can be received via wired or wireless communication and displayed on the control device side.

Series of Operations of Main Processing

Figure 3:
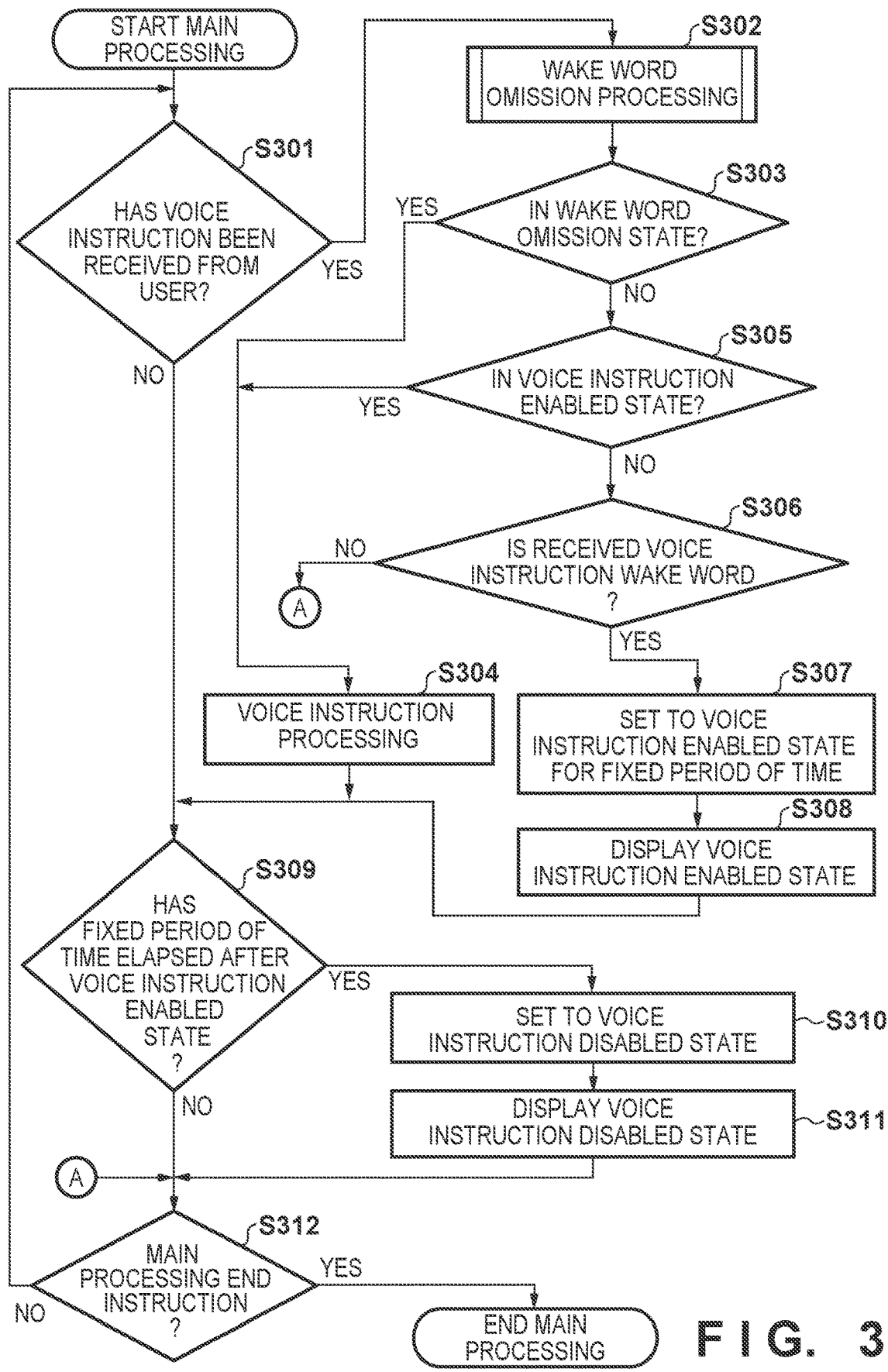
FIG. 3 is a flowchart showing a series of operations of main processing according to the first embodiment.

Next, the main processing according to the present embodiment will be described with reference to FIG. 3. Operations of the main processing are operations from recognition of the voice of the user to completion of the voice operation. Note that each processing of the main processing is realized by programs stored in the nonvolatile memory 56 being extracted to the system memory 52 and executed by the system control unit 50. Also, the wake word is a specific voice instruction for enabling operations by voice on the digital camera 100.

In step S301, the system control unit 50 determines whether a voice instruction from the user has been received from the voice input unit 85. The system control unit 50 advances to step S302 if it is determined that a voice instruction from the user has been received from the voice input unit 85, and advances to step S309 if it is determined that a voice instruction from the user has not been received, based on a signal from the voice input unit 85.

In step S302, the system control unit 50 executes wake word omission processing. The wake word omission processing will be described in detail later with reference to FIGS. 4A and 4B.

In step S303, the system control unit 50 determines whether the digital camera 100 is in a wake word omission state. The system control unit 50 determines whether the digital camera 100 is in the wake word omission state, based on state information of the digital camera 100 that is stored in the memory 32 (may be stored in the system memory 52; this similarly applies hereinafter), for example. The system control unit 50 advances to step S304 if it is determined that the state of the digital camera 100 is the wake word omission state, and advances to step S305 if it is determined that the state of the digital camera 100 is not the wake word omission state. As described below, generally, the digital camera 100 enters a voice instruction enabled state, in the case where the input voice instruction is the wake word, and performs processing corresponding to voice instructions received thereafter. However, in the wake word omission state, the digital camera 100 is able to execute processing corresponding to voice instructions, due to the voice instruction that is first received, without receiving the wake word (i.e., by omitting reception of the wake word). In other words, by providing the wake word omission state, quick operations become possible when performing voice operations.

In step S304, the system control unit 50 executes voice instruction processing, in accordance with voice instructions input by the user. The voice instruction processing includes processing for performing shooting of still images and moving images in accordance with voice instructions from the user, for example. Alternatively, the voice instruction processing may include processing for displaying a screen for "confirming the setting value of shutter speed (Tv value) or aperture value (Av value)" corresponding to a voice instruction or "paging through help/guidance or photos" corresponding to a voice instruction in accordance with the voice instruction.

In step S305 (i.e., in the case where the state of the digital camera 100 is a wake word non-omission state), the system control unit 50 determines whether operations by voice instruction are enabled (voice instruction enabled state). If it is determined that the state of the digital camera 100 is the voice instruction enabled state, based on the state information of the digital camera 100 that is stored in the memory 32, for example, the system control unit 50 advances to step S304. On the other hand, if it is determined that the digital camera 100 is not in the voice instruction enabled state, the system control unit 50 advances to step S306.

In step S306, the system control unit 50 determines whether the received voice instruction is a wake word determined in advance. If it is determined that the received voice instruction is a wake word determined in advance (i.e., specific voice instruction for enabling voice operations) due, for instance, to the voice instruction matching the wake word, the system control unit 50 advances to step S307. On the other hand, if it is determined that the received voice instruction is not the wake word, the system control unit 50 advances to step S312.

In step S307, the system control unit 50 sets the digital camera 100 to a state in which operations by voice instruction are enabled (i.e., voice instruction enabled state), spanning a fixed period of time. With regard to the processing of steps S303 to S305, as described above, when a voice instruction is received in the case where the digital camera 100 is in the voice instruction enabled state, processing corresponding to the voice instruction is executed. At this time, the system control unit 50 stores this state in the state information of the digital camera 100 in the memory 32, and measures the duration of the voice instruction enabled state with a timer.

Figure 5A:
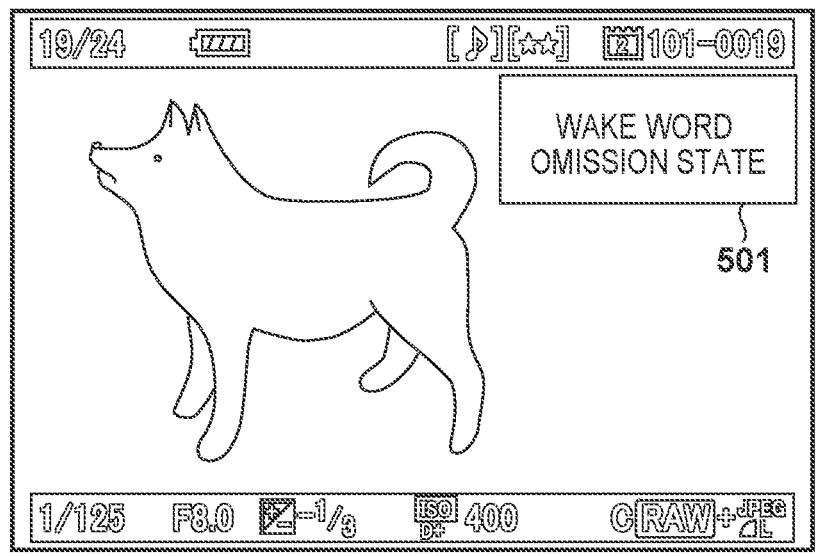
FIGS. 5A to 5C are diagrams illustrating the state of the digital camera in the first embodiment.
Figure 5B:
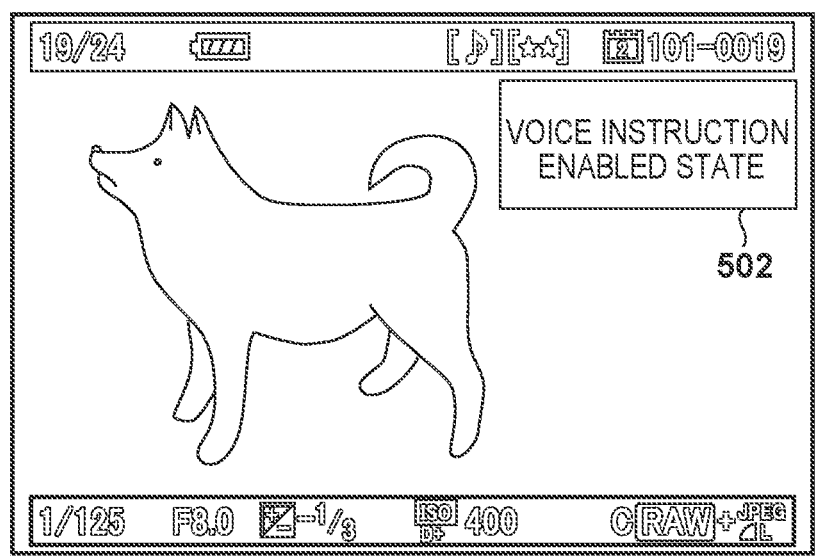

In step S308, the system control unit 50 displays a voice instruction enabled state screen shown in FIG. 5B, for example, on the display unit 28. In the example shown in FIG. 5B, a guidance 502 indicating that the state of the digital camera 100 is the voice instruction enabled state is displayed on a voice operable screen. Note that, in the example shown in FIG. 5B, the case where guidance is displayed is illustrated as an example, but a similar state may be indicated with a predetermined icon.

In step S309, the system control unit 50 determines whether a fixed period of time has elapsed after the state of the digital camera 100 changed to the voice instruction enabled state. The system control unit 50 advances to step S310 if it is determined that the fixed period of time has elapsed after changing to the voice instruction enabled state, and advances to step S312 if it is determined that the fixed period of time has not elapsed after changing to the voice instruction enabled state, based on time measured by the timer.

Figure 5C:
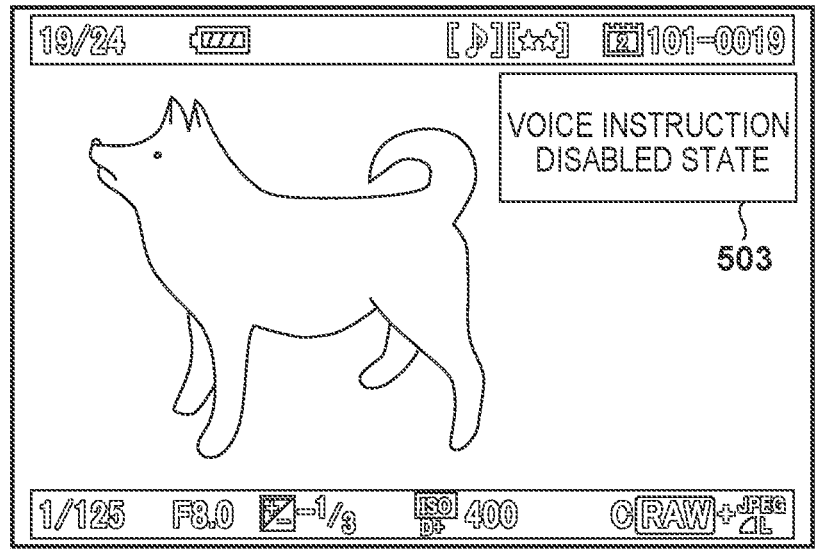

In step S310, the system control unit 50 sets the state of the digital camera 100 to a state in which operations by voice instruction are disabled (voice instruction disabled state), and stores this state in the state information of the digital camera 100 in the memory 32. In step S311, the system control unit 50 displays a voice instruction disabled state screen shown in FIG. 5C, for example, on the display unit 28. In the example shown in FIG. 5C, a guidance 503 indicating that the state of the digital camera 100 is the voice instruction disabled slate is displayed on a voice operable screen. Note that, in the example shown in FIG. 5C, the case where guidance is shown is illustrated as an example, but a similar state may be indicated with a predetermined icon.

In this way, in the case where a voice instruction is received during the fixed period of time after changing the suite of the digital camera 100 to the voice instruction enabled state, the system control unit 50 executes processing corresponding to the voice instruction. On the other hand, in the case where a voice instruction is not received during the fixed period of time after changing the state of the digital camera 100 to the voice instruction enabled state, the system control unit 50 returns the state of the digital camera 100 to the voice instruction disabled state again to ensure that voice instructions are not processed so as to avoid erroneous operations based on received voice instructions.

In step S312, the system control unit 50 determines whether there has been a main processing end instruction such as the power switch 72 being powered OFF. If it is determined that a main processing end instruction has been input, based on a signal from the power switch 72 or the operation unit 70, for example, the system control unit 50 ends the main processing. On the other hand, if it is determined that a main processing end instruction has not been input, the system control unit 50 returns the processing to step S301 in order to repeat the abovementioned processing. Note that, in the case where an anomalous operation such as turning the mode dial during the abovementioned operations is performed, the system control unit 50 may interrupt the series of operations of the main processing being performed.

Series of Operations of Wake Word Omission Processing

Figure 4A:
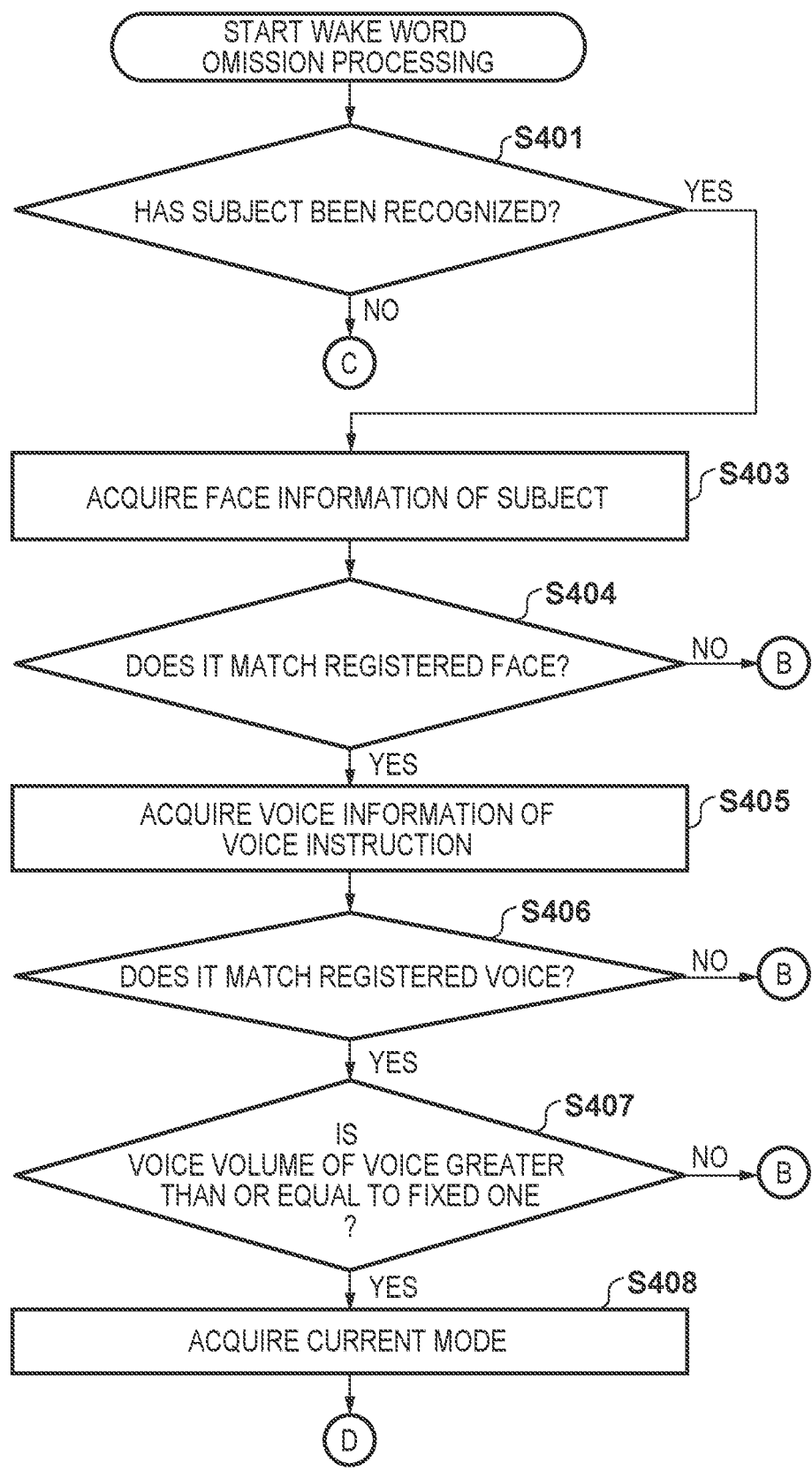
FIGS. 4A and 4B are flowcharts showing series of operations of wake word omission processing according to the first embodiment.
Figure 4B:
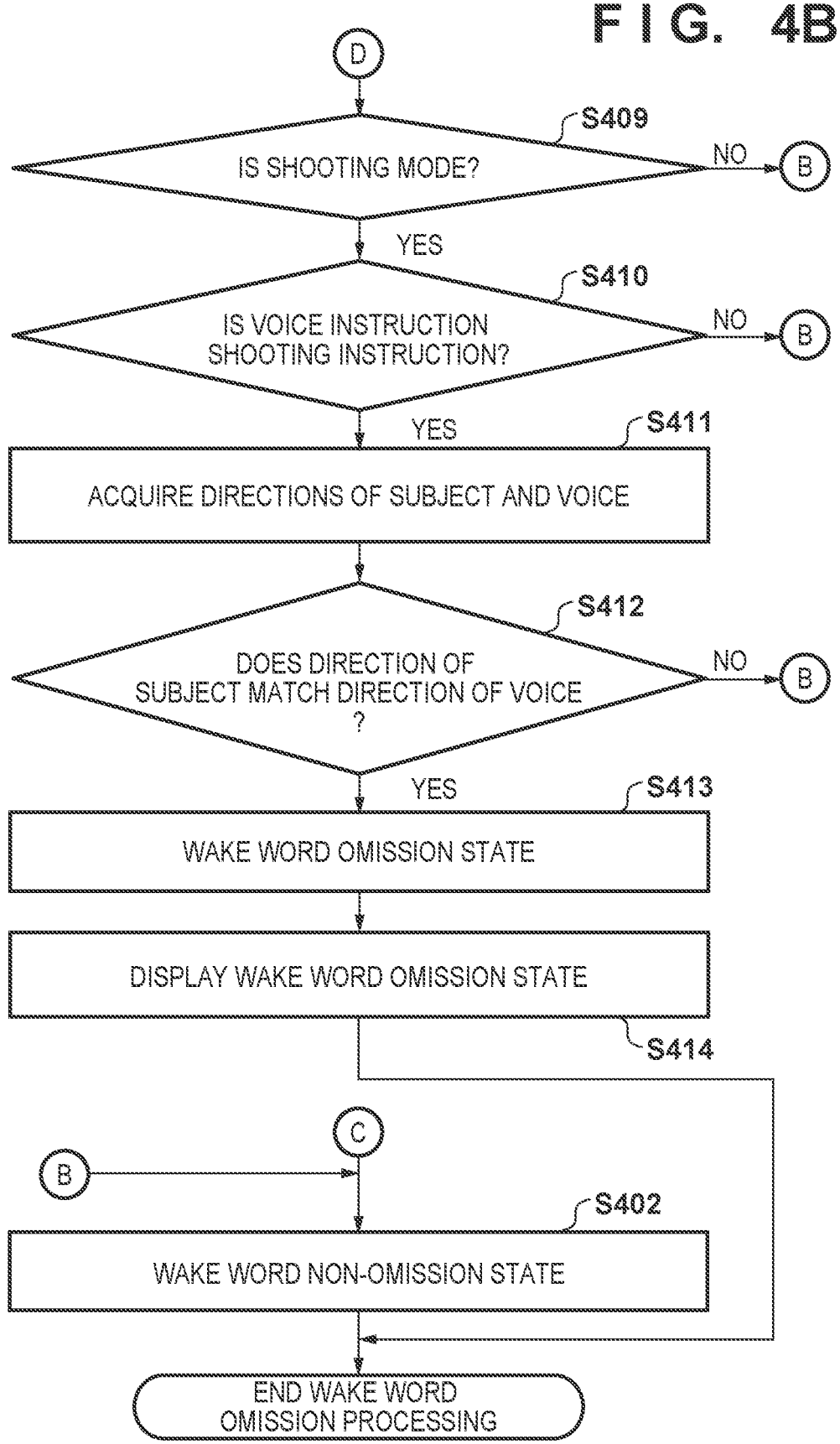

Next, the series of operations of the wake word omission processing that is executed in step S302 will be described, with reference to FIGS. 4A and 4B. The operations of the wake word omission processing are operations for controlling the state of the digital camera 100 to be in the wake word omission state, based on the position information of a subject recognized from an image and the voice direction of recognized voice. Note that the wake word omission processing is realized by a program stored in the nonvolatile memory 56 being extracted to the system memory 52 and executed by the system control unit 50, similarly to the main processing.

In step S401, the system control unit 50 determines whether a subject has been recognized in the shot image that is output by the image capture unit 22. The system control unit 50 advances to step S403 if it is determined that a subject of some sort has been recognized, and advances to step S402 if it is determined that a subject has not been recognized, as a result of image recognition processing on the shot image.

In step S402, the system control unit 50 changes the state of the digital camera 100 to the wake word non-omission state, and stores this state in the state information of the digital camera in the memory 32. Note that the wake word non-omission state is a state in which voice operations cannot be performed by voice instruction until after the user inputs the wake word. The wake word non-omission state has a sub-state of the voice instruction enabled state in which voice operations are enabled after receiving the wake word and the voice instruction disabled state in which voice operations are disabled due to not receiving the wake word.

In step S403, the system control unit 50 acquires face information including features of the recognized subject such as eyes, nose and mouth, and stores the acquired face information in the memory 32. In step S404, the system control unit 50 determines whether the face information of the recognized subject matches the face information of a user registered in advance. The system control unit 50 advances to step S405 if it is determined that the face information of the recognized subject matches the face information of a registered user, and advances to step S402 if it is determined that the face information of the recognized subject does not match the face information of a registered user.

In step S405, the system control unit 50 acquires voice information including features such as voice volume and voiceprint of voice received by the voice input unit 85, and stores the acquired voice information in the memory 32. In step S406, the system control unit 50 determines whether the voice information received by the voice input unit 85 matches the voice information of a user that is registered. If it is determined that the voice information of the voice received by the voice input unit 85 matches the voice information of a user that is registered, the system control unit 50 advances to step S407. On the other hand, if it is determined that the voice information of the voice received by the voice input unit 85 does not match the voice information of a user that is registered, the system control unit 50 advances to step S402.

In step S407, the system control unit 50 determines whether the voice volume of the voice received by the voice input unit 85 is greater than or equal to a fixed voice volume. The system control unit 50 advances to step S408 if it is determined that the voice volume of the voice received by the voice input unit 85 is greater than or equal to the fixed voice volume, and advances to step S402 if it is determined that the voice volume of the voice received by the voice input unit 85 is not greater than or equal to the fixed voice volume. By determining the voice information and voice volume in addition to the result of facial recognition using images in this way, erroneous operations in which words spoken unintentionally by the user when facing the digital camera 100 are actuated as voice instructions can be reduced.

In step S408, the system control unit 50 acquires information on the operating mode that is currently set in the digital camera 100 from the nonvolatile memory 56, and stores the acquired operating mode information in the memory 32. In step S409, the system control unit 50 determines whether the current operating mode of the digital camera 100 is the shooting mode. The system control unit 50 advances to step S410 if it is determined that the current operating mode of the digital camera 100 is the shooting mode, and advances to step S402 if it is determined that the current operating mode is not the shooting mode. In this way, the wake word can be omitted, according to whether the current operating mode is the shooting mode (i.e., operating mode that demands immediacy), thus making quick operation possible when performing voice operations, and enabling the occurrence risk of erroneous operations to be reduced.

In step S410, the system control unit 50 determines whether the voice instruction received by the voice input unit 85 is a shooting instruction determined in advance. The system control unit 50 advances to step S411 if it is determined that the voice instruction received by the voice input unit 85 is a shooting instruction determined in advance, and advances to step S402 if it is determined that the voice instruction received by the voice input unit 85 is not a shooting instruction determined in advance. In this way, if a configuration is adopted that enables the wake word to be omitted only in the case where a specific voice instruction is input, the wake word can be omitted for voice instructions (shooting instructions) that require immediacy, even when the operating mode is the shooting mode. That is, quick operation for required voice operations becomes possible, and the occurrence risk of erroneous operations is further reduced.

In step S411, the system control unit 50 acquires the direction of the recognized subject and the direction from which the voice was issued, and stores the acquired direction information of the subject and issuance direction information of the voice in the memory 32. For example, the system control unit 50 estimates the position (e.g., direction and distance) of the subject from the digital camera 100, from the size and position of the face region of the subject in the shot image. Also, the system control unit 50 calculates the issuance direction of the voice, based on the time lag of voice that is input from the abovementioned plurality of microphones, for example.

In step S412, the system control unit 50 determines whether the direction of the facially recognized subject matches tire issuance direction of the voice. The system control unit 50 advances to step S413 if it is determined that the direction of the recognized subject matches the issuance direction of the voice, and advances to step S402 if it is determined that the direction of the recognized subject does not match the issuance direction of the voice. At this time, if the direction of the facially recognized subject matches the issuance direction of the voice, it can be estimated that the user who is the subject issued the voice instruction.

In step S413, the system control unit 50 changes the state of the digital camera 100 to the wake word omission state, and stores the state information of the digital camera 100 in the memory 32. By adopting this configuration, the wake word can be omitted, in the case where it can be estimated that the user who is the subject issued the voice instruction, based on image recognition of the subject and recognition of the issuance direction of the voice.

In step S414, the system control unit 50 displays, on the display unit 28, display indicating that the digital camera is in the wake word omission state. FIG. 5A shows an example in which a guidance 501 indicating the wake word omission state is shown on a voice operable screen. Note that, in this example, the case where guidance is displayed is given as an example, but a similar state may be shown with an icon.

Note that, in the abovementioned description, an example in which the present embodiment is carried out using images shot of the front side of the digital camera 100 was illustrated. However, an unillustrated image capture unit may also be further disposed on the back side of the digital camera 100 (i.e., an image capture unit may be provided on both the front and back sides like a smartphone), and the abovementioned embodiment may be applied to a user who is on the back side of the digital camera 100. Alternatively, in an apparatus that is provided with an image capture unit on both the front and back sides, it may be determined whether the direction of the facially recognized subject matches the issuance direction of the voice, having further taken into consideration whether the image was shot with the camera on the front side or the back side. The abovementioned embodiment may, of course, be applied to an apparatus in which the image capture unit is disposed in a cylindrical casing.

Also, in the abovementioned description, the case where the apparatus that recognizes the subject is integrated with the apparatus that inputs voice was illustrated as an example. However, the present embodiment is also applicable to a configuration in which these apparatuses are separate, such as a configuration in which images are captured with a camera and voice is input with a smartphone, for example. Also, in the present embodiment, the case where a digital camera is used was illustrated as an example, but the present embodiment is also applicable to a configuration in which a smartphone is provided with a shooting function and a voice input function.

As described above, according to the present embodiment, erroneous operations can be prevented since voice operations are started by conveying a wake word in the case where the direction from which the voice was received differs from the direction in which the subject is present. In the case where the direction from which the voice is received is the same as the direction in which the subject is present, voice operations can be immediately started by omitting the wake word, making it possible to provide voice operations that are user friendly and not susceptible to erroneous operations.

Second Embodiment

Next, a second embodiment will be described. In the second embodiment, the relative direction and distance of the user (another communication apparatus) are measured using near field communication, and changing of the state to the wake word omission state or the voice instruction enabled state is controlled with consideration for the relative direction and distance. Thus, the configuration of a digital camera 600 of the present embodiment further includes a near field communication unit in the configuration of the first embodiment, but the remaining configuration is the same or substantively the same as the first embodiment. Also, in the present embodiment, part of the main processing and the wake word omission processing of the second embodiment differ from the first embodiment, but the remaining processing is the same or substantively the same. Accordingly, description regarding configuration that is the same and processing that is the same will be omitted, and the description will focus on the differences.

Configuration of Digital Camera 600

Figure 6:
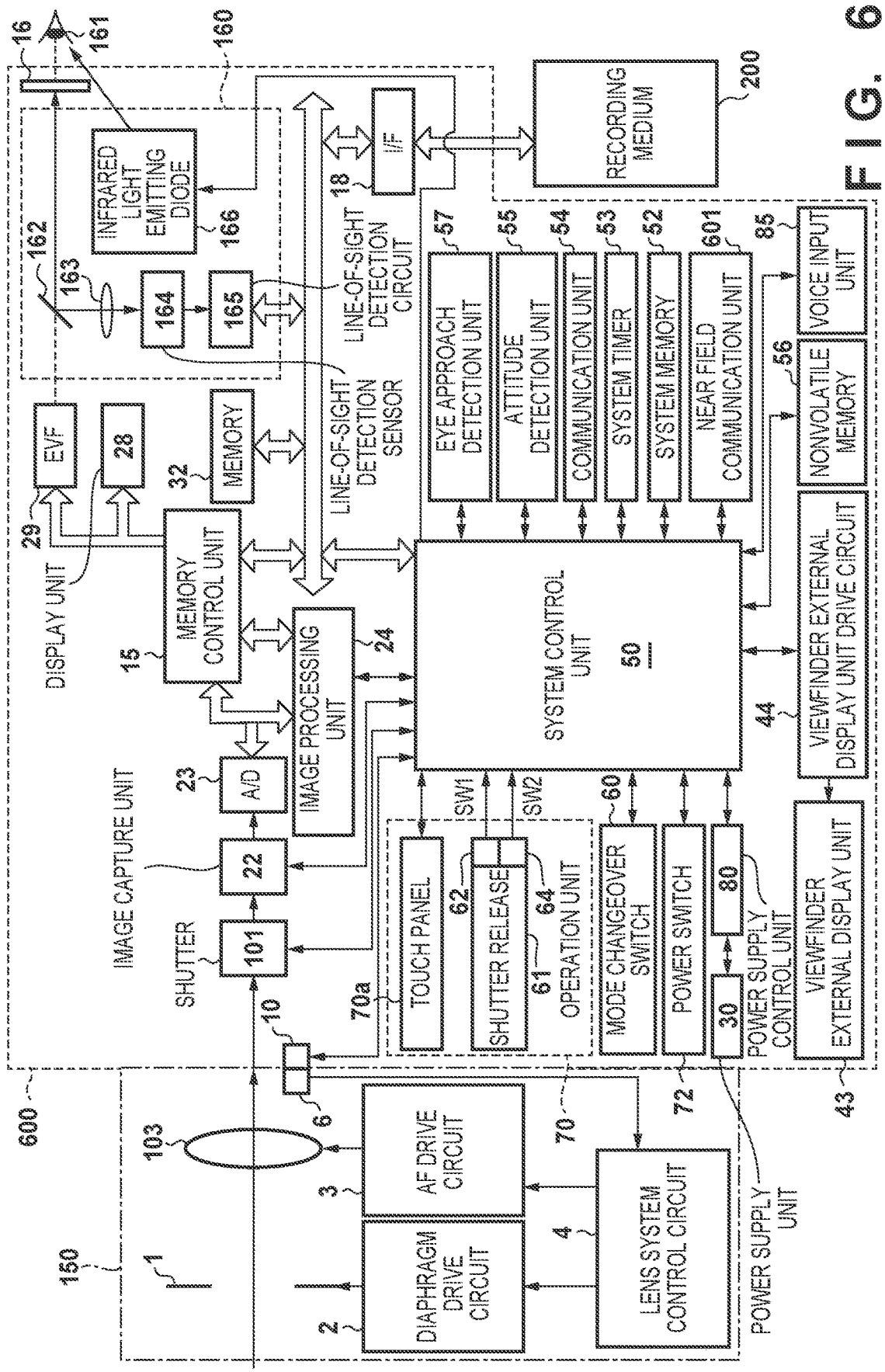
FIG. 6 is a block diagram showing an example functional configuration of a digital camera according to a second embodiment.

FIG. 6 shows an example functional configuration of the digital camera 600 serving as an example of a voice input apparatus according to the present embodiment.

A near field communication unit 601 includes an antenna for wireless communication and a modulation demodulation circuit, a communication controller and the like in order to process wireless signals, for example. The near field communication unit 601 realizes near field communication that conforms to the IEEE 802.15 standard (so-called Bluetooth (registered trademark)) by outputting modulated wireless signals from the antenna and demodulating wireless signals received with the antenna. In the present embodiment, Bluetooth (registered trademark) communication employs Version 5.1 of Bluetooth (registered trademark) Low Energy which has low power consumption, for example. This Bluetooth (registered trademark) communication has a narrow communicable range (i.e., communicable distance is short) compared with wireless LAN communication. Also, Bluetooth (registered trademark) communication has a slow communication speed compared with wireless LAN communication. On the other hand, Bluetooth (registered trademark) communication has little power consumption compared with wireless LAN communication.

Note that the digital camera 600 in the present embodiment has a function of measuring the relative direction and distance of another Bluetooth (registered trademark) device which is a communication apparatus, by Bluetooth (registered trademark) communication via the near field communication unit 601. The near field communication unit 601 sends a direction detection signal from the antenna. The other Bluetooth (registered trademark) device calculates the relative direction and distance of the digital camera 600, based on Bluetooth (registered trademark) 5.1, and transmits the relative direction and distance to the digital camera 600. The system control unit 50 of the digital camera 600 calculates the relative position of the other Bluetooth (registered trademark) device, from the relative direction and distance of the other Bluetooth (registered trademark) device received via the near field communication unit 601, and holds the calculated relative position in the memory 32.

In the present embodiment, the communication speed of communication that is realized by the communication unit 54 is faster than the communication speed of communication that is realized by the near field communication unit 601. Also, communication that is realized by the communication unit 54 has a wider communicable range than communication by the near field communication unit 601.

The communication unit 54 of the digital camera 600 in the present embodiment has an AP mode in which the digital camera 600 operates as an access point in an infrastructure mode and a CL mode in which the digital camera 600 operates as a client in the infrastructure mode. By operating the communication unit 54 in the CL mode, it is possible for the digital camera 600 in the present embodiment to operate as a CL device in the infrastructure mode. In the case where the digital camera 600 operates as a CL device, it is possible to participate in a network that is formed by a nearby AP device, by connecting to the AP device. Also, by operating the communication unit 54 in the AP mode, it is possible for tire digital camera 600 in the present embodiment to also operate as a simplified AP (hereinafter, simple AP) which is a type of AP but with limited functionality. When the digital camera 600 operates as a simple AP, the digital camera 600 forms a network itself. It becomes possible for apparatuses nearby the digital camera 600 to recognize the digital camera 600 as an AP device, and participate in the network formed by the digital camera 600. A program for operating the digital camera 600 is assumed to be held in the nonvolatile memory 56 as described above.

Note that, the digital camera 600 in the present embodiment is a simple AP that, despite being a type of AP, does not have a gateway function for transferring data received from a CL device to an Internet provider or the like. Accordingly, even when data is received from other apparatuses that are participating in the network formed by the digital camera 600, the digital camera 600 is not able to transfer the received data to a network such as the Internet.

Configuration of Mobile Phone 700

Figure 7:
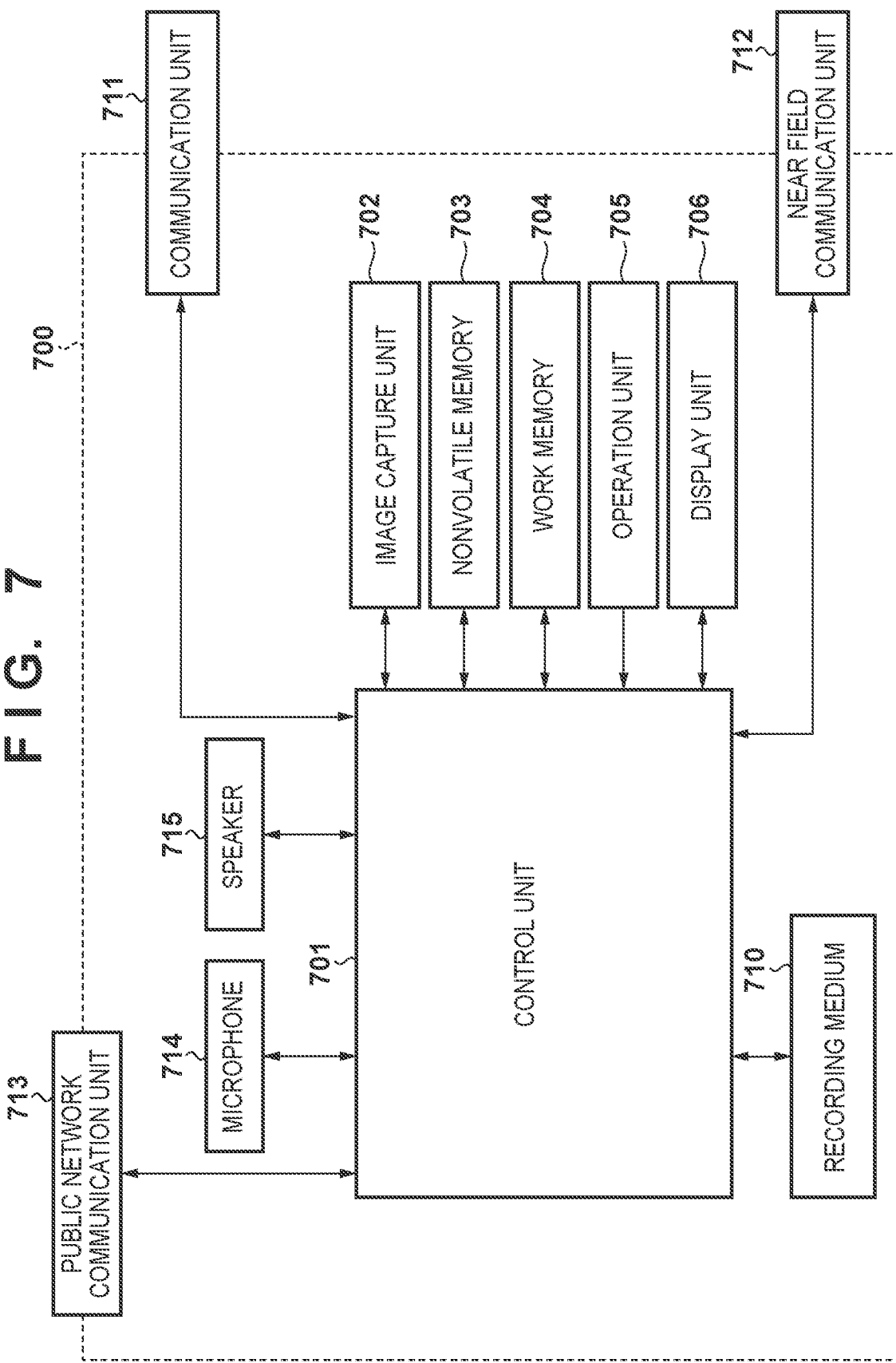
FIG. 7 is a block diagram showing an example functional configuration of a mobile phone serving as an example of a communication apparatus according to the second embodiment.

As described above, measurement of relative direction and distance using near field communication requires a partner communication apparatus. An example functional configuration of a mobile phone 700 which is an example of a communication apparatus of the present embodiment will be described, with reference to FIG. 7. Note that, in the following description, an example will be illustrated in which a mobile phone is given as an example of a communication apparatus, but the communication apparatus is not limited thereto. For example, the communication apparatus may be a digital camera capable of wireless communication, a tablet device, or a personal computer.

A control unit 701 includes one or more processors such as a CPU, for example, and controls the units of the mobile phone 700, by executing programs described later and input signals. Note that, instead of the control unit 701 controlling the entire apparatus, the entire apparatus may be controlled by a plurality of hardware sharing processing.

The image capture unit 702 converts subject light formed by a lens that is included in the image capture unit 702 into electrical signals, performs noise reduction processing and the like, and outputs digital data as image data. After being stored in a buffer memory, captured image data undergoes predetermined computational operations by the control unit 701, and is recorded to a recording medium 710.

A nonvolatile memory 703 is an electrically erasable-recordable memory. The nonvolatile memory 703 stores programs that are executed by the control unit 701, that is, an OS (operating system) which is basic software, applications that realize applied functions in cooperation with this OS, and the like. Also, in the present embodiment, the nonvolatile memory 703 stores an application (also simply called an app) for communicating with the digital camera 600. A work memory 704 is used as an image display memory of the display unit 706, a work area of the control unit 701, and the like.

An operation unit 705 is used in order to receive instructions for the mobile phone 700 from the user. The operation unit 705 includes operation members such as a power button for the user to instruct power ON/OFF of the mobile phone 700 and a touch panel that is formed on the display unit 706.

A display unit 706 performs display of image data, character display for interactive operations, and the like. Note that the mobile phone 700 does not necessarily need to be provided with the display unit 706. The mobile phone 700 need only be connectable to the display unit 706 and at least have a display control function for controlling display of the display unit 706.

The recording medium 710 is able to record image data output by an image capture unit 702. The recording medium 710 may be configured to be removable from the mobile phone 700 or may be built into the mobile phone 700. That is, the mobile phone 700 need only at least have a function to access the recording medium 710.

A communication unit 711 is a communication interface for connecting to an external device, and includes a communication circuit or a communication module. The mobile phone 700 of the present embodiment is able to exchange data with the digital camera 600 via the communication unit 711. In the present embodiment, the communication unit 711 includes an antenna, and the control unit 701 is able to connect to the digital camera 600 via the antenna. Note that, with the connection to the digital camera 600, the control unit 701 may be directly connected or may be connected via an access point. As for the protocol for communicating data, PTP/IP (Picture Transfer Protocol over Internet Protocol) through a wireless LAN, for example, can be used. Note that communication with the digital camera 600 is not limited thereto. For example, the communication unit 711 can include an infrared communication module, a Bluetooth (registered trademark) communication module, or a wireless communication module such as a Wireless USB. Furthermore, the communication unit 711 may employ wired connection such as a USB cable, HDMI (registered trademark), or IEEE 1394.

A near field communication unit 712 is constituted by an antenna for wireless communication and a modulation/demodulation circuit, a communication controller and the like in order to process wireless signals, for example. The near field communication unit 712 realizes near field communication that conforms to IEEE 802.15 by outputting modulated wireless signals from the antenna and demodulating wireless signals received by the antenna. In the present embodiment, the near field communication unit 712 communicates with other apparatuses in accordance with IEEE 802.15.1 (so-called Bluetooth (registered trademark)). Also, in the present embodiment, Bluetooth (registered trademark) communication employs Bluetooth (registered trademark) Low Energy 5.1 (BLE) which has low power consumption, for example.

Note that the mobile phone 700 in the present embodiment has a function of detecting the direction of a signal sent from another Bluetooth (registered trademark) device by Bluetooth (registered trademark) communication via the near field communication unit 712, and a function of measuring the distance to the device that sent the signal. In the case where a plurality of antennas for wireless communication are provided and a direction detection signal is received, the near field communication unit 712 calculates the relative direction of the device that sent the signal from the phase difference for every antenna. The near field communication unit 712 measures the distance to the device that sent the signal from the field intensity of the received signal. Also, the control unit 701 of the mobile phone 700 transmits the detected signal direction and the measured distance by Bluetooth (registered trademark) communication to the other Bluetooth (registered trademark) device, via the near field communication unit 712.

A public network communication unit 713 is a communication interface that is used when performing public wireless communication, and includes a communication circuit or a communication module. The mobile phone 700 is able to call other devices, via the public network communication unit 713. At this time, the control unit 701 realizes calling, by inputting and outputting voice signals via a microphone 714 an a speaker 715. In the present embodiment, the public network communication unit 713 is an antenna, and the control unit 701 is able to connect to a public network, via an antenna. Note that one antenna can serve as both the communication unit 711 and the public network communication unit 713.

Series of Operations of Wake Word Omission Processing

Figure 8:
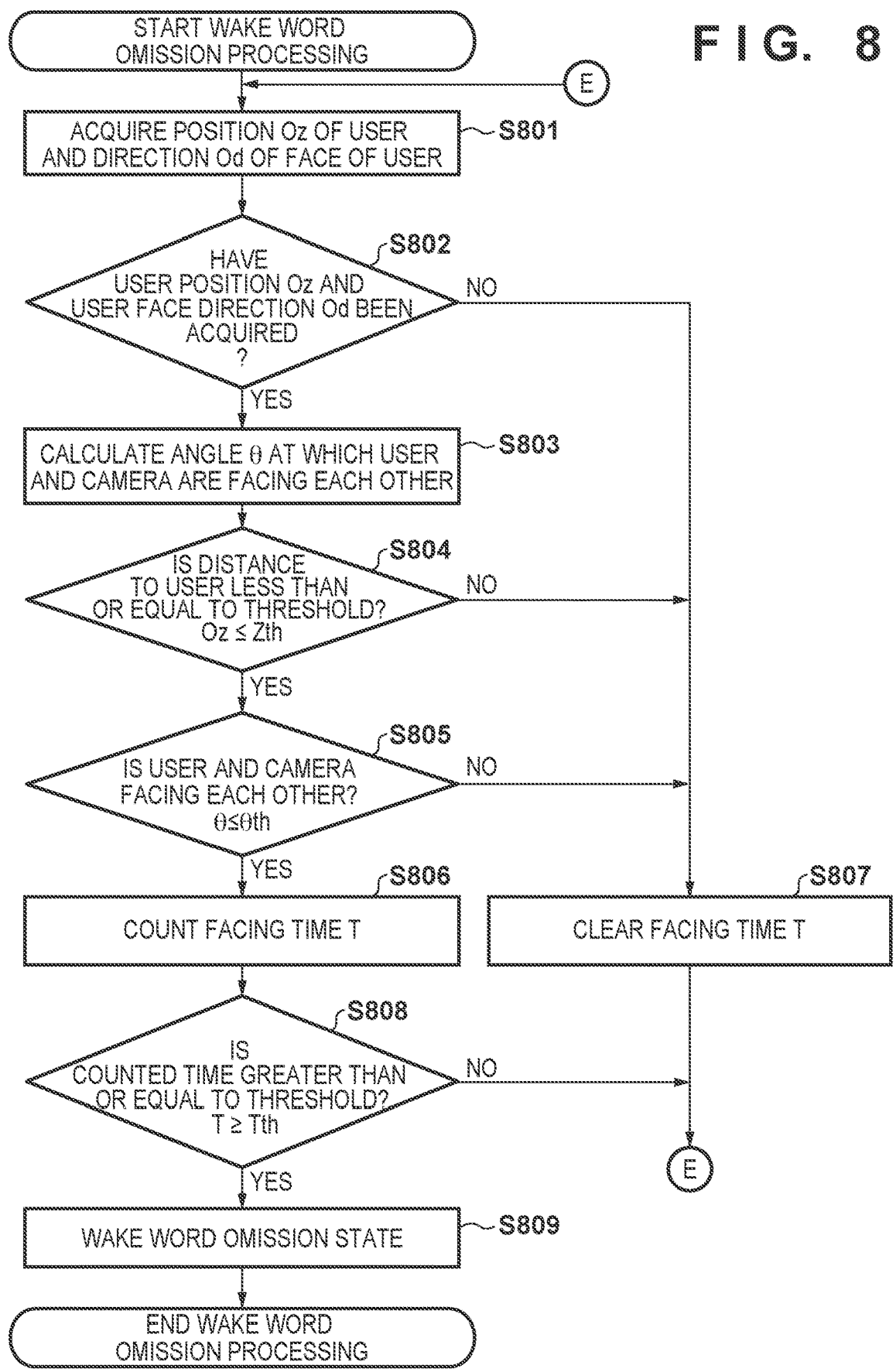
FIG. 8 is a flowchart showing a series of operations of wake word omission processing according to the second embodiment.

Next, the series of operations of wake word omission processing for setting the state of the digital camera to the wake word omission state in the case where the digital camera 600 and the user are facing each other at close range will be described, with reference to FIG. 8. Note that this series of operations is realized by a program stored in the nonvolatile memory 56 being extracted to the system memory 52 and executed by the system control unit 50. Also, this series of operations is started in the case where, for example, it is determined that a voice instruction was received (Yes in step S301) in the main processing according to the present embodiment shown in FIG. 9 (corresponds to step S901 in FIG. 9).

In step S801, the system control unit 50 calculates information on a position Oz of the user and a direction Od in which the user is facing, and stores the calculated information in the memory 32. For example, the system control unit 50 recognizes the face region of the user in the image from image data acquired by the image capture unit 22 and calculates the position Oz of the user from the size of the face and the coordinates of the face. Alternatively, a method may be employed that involves calculating the position Oz of the user from the relative direction and distance of the user that are obtained with the communication signals of the near field communication unit 601 and the mobile phone 700 that the user is carrying. The system control unit 50 recognizes the face region of the user in the image from the image data acquired by the image capture unit 22, and calculates the direction Od in which the user is facing (e.g., vertical/horizontal tilt angle relative to frontal face) from the orientation of the face. At this time, the system control unit 50 may store the face region of the user in the image in the memory 32 as coordinates Ov in the image. In the case where a plurality of persons are detected in the image, the system control unit 50 may store the position Oz, the direction Od and the coordinates Ov in the image for the number of detected persons in the memory 32. In the case where the position Oz of the user is received by the near field communication unit 601, the system control unit 50 may collate the person (user) holding the mobile phone 700 with the persons in the image, by comparing the coordinates Ov in the image, and calculate the position Oz and the direction Od.

In step S802, the system control unit 50 reads out the position Oz and the direction Od from the memory 32, and determines whether the user was observed depending on whether the position Oz and direction Od exist. The system control unit 50 advances to step S803 if it is determined that the user was observed, and advances to step S807 if this is not the case.

In step S803, the system control unit 50 reads out the orientation of the optical axis of the image capture unit 22 and the direction Od in which the user is facing from the memory 32, calculates an angular difference θ in orientation (angle θ at which the user and the digital camera are facing each other), and stores the calculated angular difference θ in the memory 32. The angle θ at which the user and the digital camera 600 are facing each other takes a value from 0 to 90 degrees, and takes a value of 0 degrees if the user and the digital camera 600 are directly facing each other.

In step S804, the system control unit 50 reads out, from the memory 32, the position Oz of the user and a distance threshold Zth with which the user can be judged to be at close range, and determines whether the distance to the user is less than or equal to a predetermined distance threshold (Jess than or equal to the distance threshold Zth). The system control unit 50 advances to step S805 if it is determined that the distance to the user is less than or equal to the distance threshold, and advances to step S807 if it is determined that the distance to the user is greater than the distance threshold. In the case where the position Oz and direction Od for a plurality of persons are read out from the memory 32, the system control unit 50 may change the distance threshold Zth, in order to distinguish normal conversation between persons from a voice input to the camera 600.

In step S805, the system control unit 50 reads out, from the memory 32, the angle θ at which the user and the digital camera 600 are facing each other and an angle threshold θth with which the user and the digital camera can be judged to be facing each other, and determined whether the angle θ is less than or equal to a predetermined angle threshold (less than or equal to the angle threshold θth). The system control unit 50 advances to step S806 if it is determined that the angle θ is less than or equal to the angle threshold θth, and advances to step S807 if it is determined that the angle θ is larger than the threshold. Note that, in the case where the position Oz and direction Od for a plurality of persons are read out from the memory 32, the system control unit 50 may change the angle threshold θth, in order to distinguish normal conversation between persons from a voice input to the camera 600.

In this way, if the user is at close range and the angle difference between the orientation of the face of the user and the orientation of the optical axis of the image capture unit 22 is less than or equal to the angle threshold, the system control unit 50 is able to estimate that the user and the digital camera 600 are facing each other, and that the user who is the subject issued the voice instruction.

In step S806, the system control unit 50 reads out a facing time T from the memory 32, counts up the facing time T, and stores the counted-up time T in the memory 32. In step S807, the system control unit 50 reads out the facing time T from the memory 32, clears the facing time T, and stores the cleared facing time T in the memory 32. The system control unit 50 thereafter returns the processing to step S801.

In step S808, the system control unit 50 reads out the facing time T and a time threshold Tth from the memory 32, and determines whether the facing time T is greater than or equal to a predetermined time threshold (greater than or equal to the time threshold Tth). The system control unit 50 advances to step S809 if it is determined that the facing time T is greater than or equal to the time threshold Tth, and advances to step S801 if it is determined that the facing time T is shorter than the time threshold Tth. The time threshold Tth is set to a time determined in advance with which it can be judged that the camera and the user are facing each other, such as in an eye contact manner. In this way, the system control unit 50 is able to determine that the user and the digital camera 600 are facing each other with further consideration for the facing time. In the case where the position Oz and direction Od for a plurality of persons are read from the memory 32, the system control unit 50 may change the time threshold Tth, in order to distinguish normal conversation between persons from a voice input to the camera 600. The time threshold Tth may be 0.

In step S809, the system control unit 50 sets the state of the digital camera 600 to the wake word omission state, and stores the set state information in the memory 32. The system control unit 50 thereafter ends this wake word omission processing.

Series of Operations of Main Processing

Figure 9:
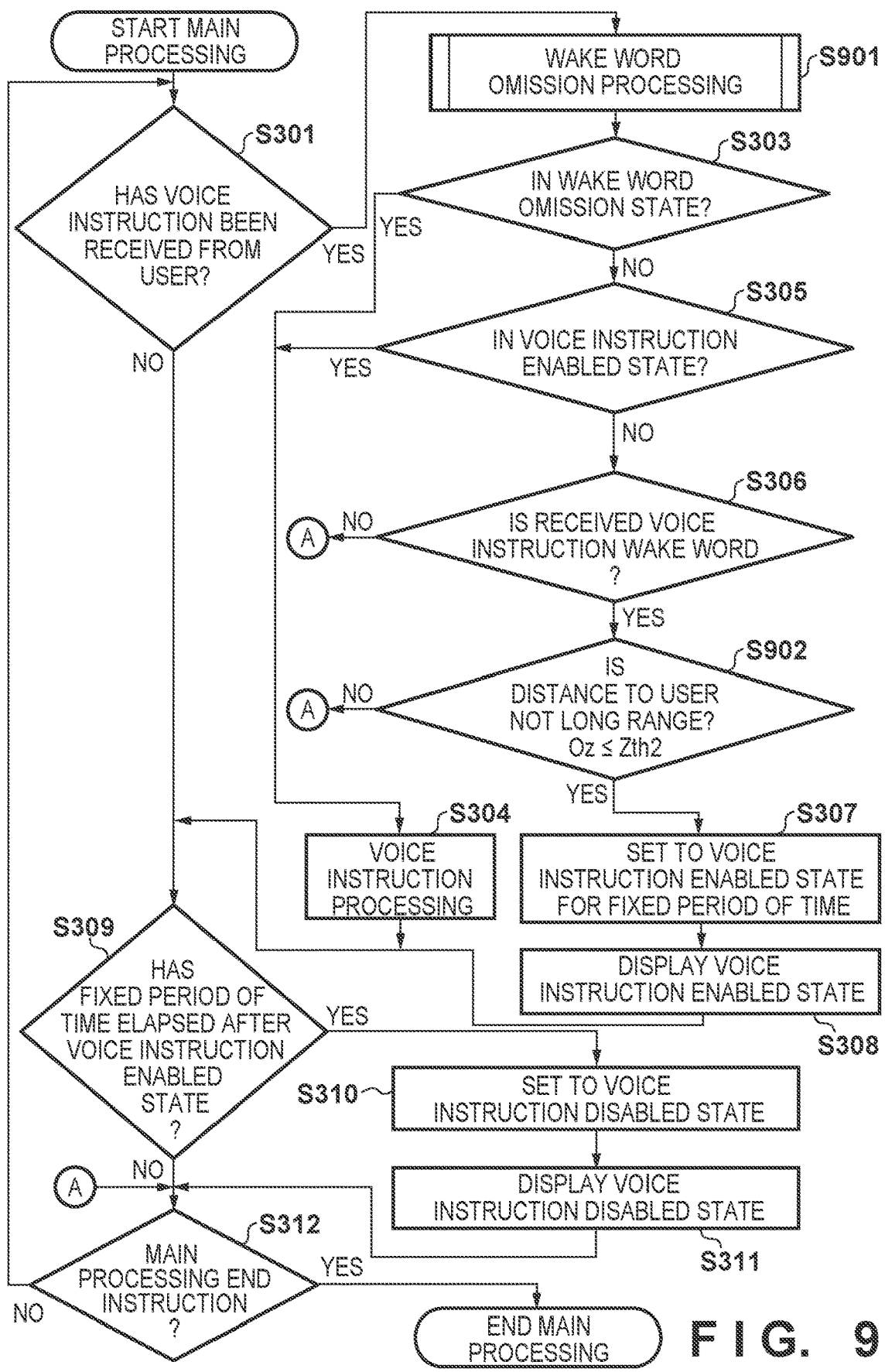
FIG. 9 is a flowchart showing a series of operations of main processing according to the second embodiment.

FIG. 9 shows the series of operations of the main processing in the present embodiment. Apart from the above-mentioned wake word omission processing, this main processing differs from the main processing in the first embodiment in that the state of the digital camera 600 is set to the voice instruction enabled state, utilizing the wake word and the position of the user. That is, this main processing differs from the main processing in the first embodiment in that the processing of step S902 is performed after the determination processing in step S306.

In step S301 and steps S303 to S306, the system control unit 50 executes processing similarly to the first embodiment. Also, in step S901, the abovementioned wake word omission processing in the second embodiment is executed.

In step S902, the system control unit 50 reads out, from the memory 32, the position Oz of the user and a distance threshold Zth2 with which the user can be judged to be at long range. If it is determined that the position Oz of the user is less than or equal to a predetermined distance threshold (less than or equal to the distance threshold Zth2), the system control unit 50 advances to step S307. On the other hand, if it is determined that the position Oz of the user is a position further away than the distance threshold, the system control unit 50 returns to step S312. Thereafter, the system control unit 50 executes the processing from step S307 similarly to the first embodiment, and ends the main processing.

As described above, according to the present embodiment, voice instructions can be received without receiving the wake word, if the digital camera and the user are facing each other at close range. Thus, it become possible to suppress the occurrence of erroneous operations while enabling quick operations when performing voice operations, and it becomes possible to provide the user with a more natural and intuitive UI.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiments), and by a method performed by the computer of the system or apparatus by for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)(™)), a flash memory device, a memory card, and the like.

While the present invention has been described with reference to exemplars embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-018211, filed Feb. 5, 2020 which is hereby incorporated by reference herein in its entirety.

What is claimed is:

1. A voice input apparatus comprising:
a voice input device configured to input voice;
one or more processors; and
a memory storing instructions which, when the instructions are executed by the one or more processors, cause the voice input apparatus to function as:
a control unit configured to perform control to, in a case where a second voice instruction for operating the voice input apparatus is input in a fixed period after a first voice instruction for enabling operations by voice on the voice input apparatus is input, execute processing corresponding to the second voice instruction,
wherein the control unit, in a case where it is estimated that a predetermined user issued the second voice instruction and the voice input apparatus is in a wake word omission state, executes processing corresponding to the second voice instruction issued by the predetermined user when the second voice instruction is input and the first voice instruction is not input.

2. The voice input apparatus according to claim 1, further comprising:
an image capture device configured to output a shot image including the predetermined user as a subject,
wherein the control unit:
calculates a first direction representing a direction of the predetermined user from the voice input apparatus based on the shot image, and calculates a direction from which the second voice instruction issued as a second direction based on the second voice instruction, and
in a case where the first direction matches the second direction, estimates that the predetermined user issued the second voice instruction.

3. The voice input apparatus according to claim 1, further comprising:
an image capture device configured to output a shot image including the predetermined user as a subject,
wherein the control unit:
calculates a distance from the voice input apparatus to the predetermined user based on the second voice instruction, and calculates an orientation of a face of the subject in the shot image as a third direction, and
in a case where the distance to the predetermined user is less than or equal to a threshold, and it is determined that a fourth direction which is an orientation of the voice input apparatus and the third direction are facing each other, estimates that the predetermined user issued the second voice instruction.

4. The voice input apparatus according to claim 1, further comprising:
  an image capture device configured to output a shot image including the predetermined user as a subject; and
  a communication device configured to perform near field communication with a communication apparatus of the predetermined user,
  wherein the control unit:
    calculates a distance from the voice input apparatus to the communication apparatus based on the near field communication with the communication apparatus, and calculates an orientation of a face of the subject in the shot image as a third direction, and
    in a case where the distance to the communication apparatus is less than or equal to a threshold, and it is determined that a fourth direction which is an orientation of the voice input apparatus and the third direction are facing each other, estimates that the predetermined user issued the second voice instruction.

5. The voice input apparatus according to claim 3, wherein the control unit, in a case where an angle difference between the fourth direction and the third direction that is determined by an orientation of an optical axis of the image capture device is less than or equal to a predetermined angle threshold, determines that the fourth direction which is the orientation of the voice input apparatus and the third direction are facing each other.

6. The voice input apparatus according to claim 5, wherein the control unit, in a case where an angle difference between the fourth direction and the third direction that is determined by an orientation of an optical axis of the image capture device is less than or equal to a predetermined angle threshold, and a time for which the angle difference is less than or equal to the predetermined angle threshold is greater than or equal to a predetermined time threshold, determines that the fourth direction which is the orientation of the voice input apparatus and the third direction are facing each other.

7. The voice input apparatus according to claim 3, wherein the control unit, in a case where the distance from the voice input apparatus to the predetermined user is not less than or equal to the threshold, does not execute processing corresponding to the second voice instruction, even if the second voice instruction is input.

8. The voice input apparatus according to claim 2, the instructions further causing the voice input apparatus to function as:
  a determination unit configured to determine whether the predetermined user is a registered user, based on a face of the subject in the shot image or a voice of the second voice instruction,
  wherein the control unit, in a case where it is determined that the predetermined user is a registered user, and it is estimated that the predetermined user issued the second voice instruction, executes processing corresponding to the second voice instruction when the second voice instruction is input, even in a case where the first voice instruction is not input.

9. The voice input apparatus according to claim 2, wherein the control unit does not execute processing corresponding to the second voice instruction if the voice input apparatus is not set to a mode for shooting.

10. The voice input apparatus according to claim 9, wherein the control unit does not execute processing corresponding to the second voice instruction, if the second voice instruction is not a shooting instruction.

11. The voice input apparatus according to claim 2, wherein the image capture device is disposed on at least one of a front side and a back side of the voice input apparatus.

12. The voice input apparatus according to claim 1, wherein the control unit does not execute processing corresponding to the second voice instruction, if a voice volume of the second voice instruction is not greater than or equal to a fixed voice volume.

13. The voice input apparatus according to claim 1, wherein the voice input device is configured so as acquire, from an external device, voice input by the external device.

14. A control method of a voice input apparatus, the voice input apparatus comprising a voice input device configured to input voice, the control method comprising:
  performing control to, in a case where a second voice instruction for operating the voice input apparatus is input in a fixed period after a first voice instruction for enabling operations by voice on the voice input apparatus is input, execute processing corresponding to the second voice instruction,
  wherein, in the controlling, in a case where it is estimated that a predetermined user issued the second voice instruction and the voice input apparatus is in a wake word omission state, processing corresponding to the second voice instruction issued by the predetermined user is executed when the second voice instruction is input and the first voice instruction is not input.

15. A non-transitory computer-readable storage medium comprising instructions for performing a control method of a voice input apparatus, the voice input apparatus comprising a voice input device configured to input voice, the control method comprising:
  performing control to, in a case where a second voice instruction for operating the voice input apparatus is input in a fixed period after a first voice instruction for enabling operations by voice on the voice input apparatus is input, execute processing corresponding to the second voice instruction,
  wherein, in the controlling, in a case where it is estimated that a predetermined user issued the second voice instruction and the voice input apparatus is in a wake word omission state, processing corresponding to the second voice instruction issued by the predetermined user is executed when the second voice instruction is input and the first voice instruction is not input.

* * * * *